Jan. 18, 1966  L. HOLMES, JR  3,229,905
RULER FOR MAKING NAVIGATIONAL COMPUTATIONS
Filed Dec. 18, 1961  3 Sheets-Sheet 1

INVENTOR.
Lawrence Holmes, Jr.
BY
Fryer & Tjensvold
Attorney

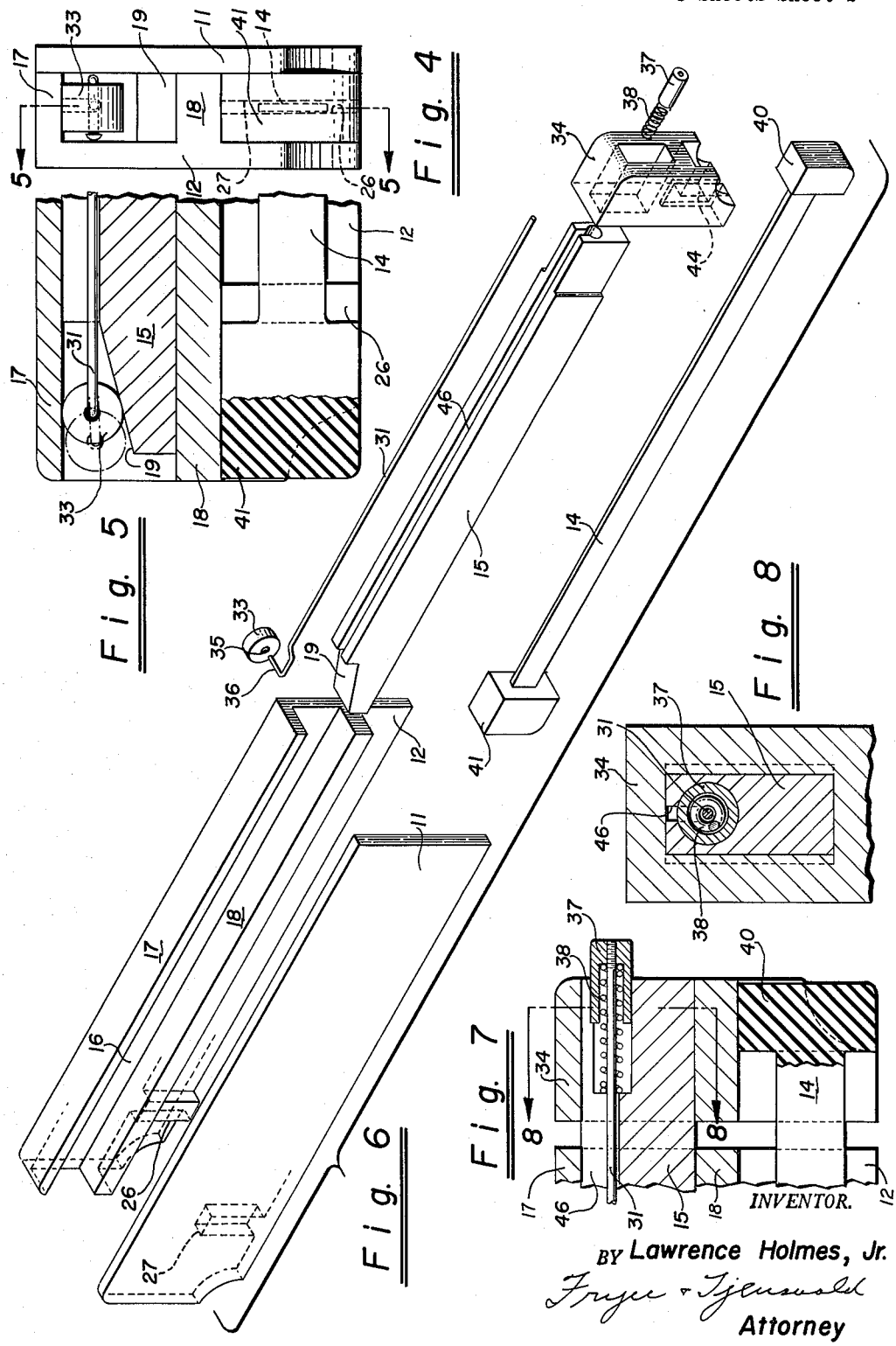

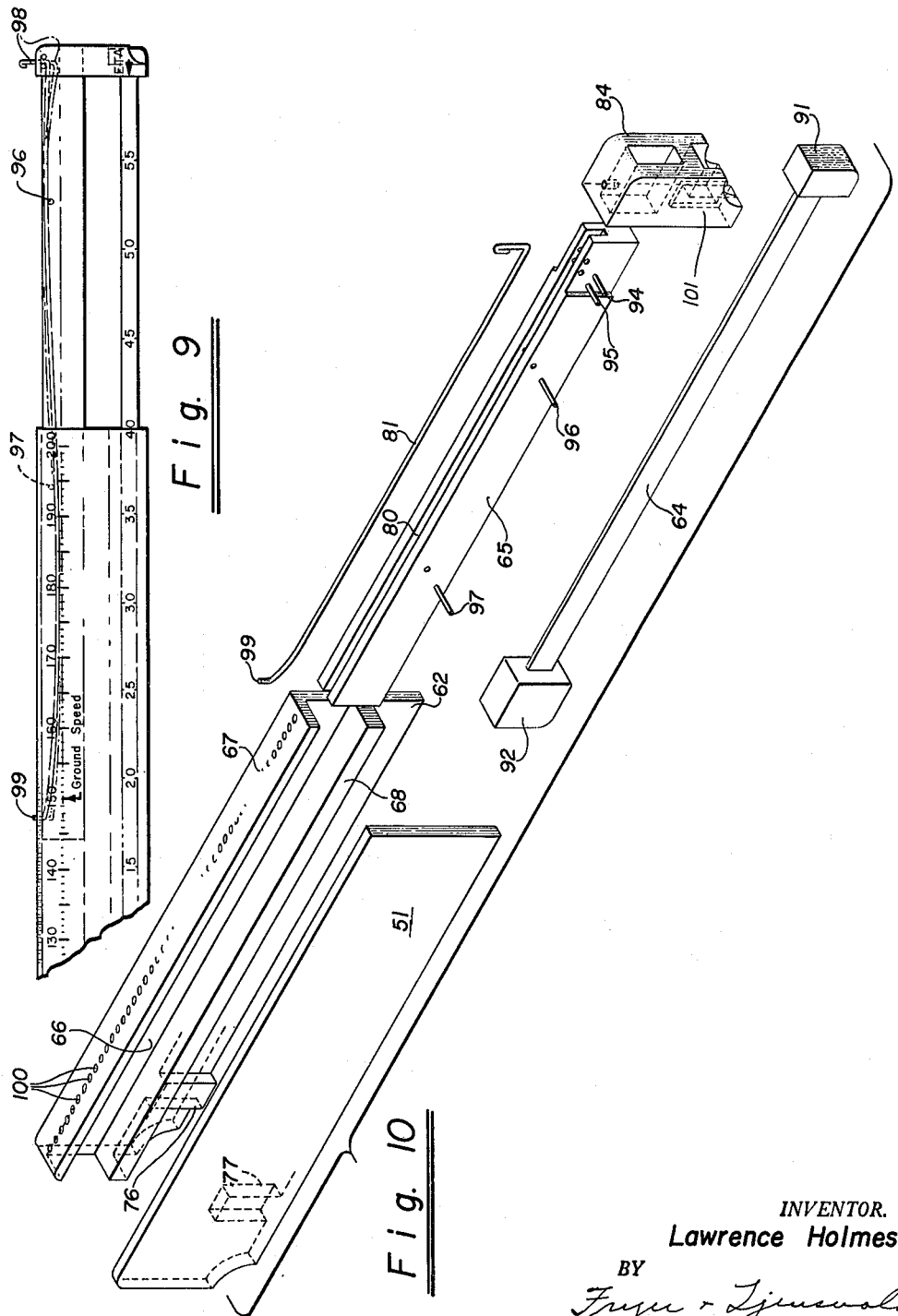

United States Patent Office 3,229,905
Patented Jan. 18, 1966

3,229,905
RULER FOR MAKING NAVIGATIONAL
COMPUTATIONS
Lawrence Holmes, Jr., 305 S. 3rd St., Las Vegas, Nev.
Filed Dec. 18, 1961, Ser. No. 160,093
3 Claims. (Cl. 235—70)

The present invention concerns an extensible ruler used as a computer in navigation to calculate travel time between map points or to calculate ground speed. More specifically, the present invention relates to a time-measure ruler which has a time scale that can be adjusted in length to equal map distances travelled at a designated speed in a time period such as sixty minutes. The present invention also relates to a novel method of ascertaining estimated travel time and features certain superior mechanical means for fixing the length of the described ruler.

In the past innumerable instruments have been employed for the resolution of navigational problems such as the direction and speed of aerial flight or travel over water by boat. Broadly considered, these instruments are undesirable under operating conditions because they necessitate burdensome arithmetic calculations or because they cannot conveniently be used to measure flight time between map distances greater than their effective length. In those cases where the instrument may be walked across a map to measure travel time between distant points time consuming arithmetic calculations are still necessary thus making the instrument considerably less valuable.

It is consequently the principal object of the present invention to provide a time-measure ruler which may be employed for ascertaining travel time at a designated speed between points on a map without cumbersome and time-consuming arithmetic calculations.

Another object of the present invention is to provide a time-measure ruler which may be quickly and efficiently walked across a map to ascertain travel time between map points greater than its effective length.

Yet another object of the present invention is to provide a time-measure ruler of the type described which is simple, inexpensive, and durable in construction, yet readily manipulated without time-consuming arithmetic calculation.

Other objects of the present invention are to provide a rapid and efficient method for ascertaining travel time between map points on a map and to provide novel means for fixing the length of the described ruler in a simple, yet efficient manner.

With the foregoing and other objects in view the present invention consists of the construction, arrangement and combination of elements hereinafter set forth together with the method of using said time-measure ruler pointed out in the accompanying claims and illustrated by the accompanying drawings in which:

FIG. 4 is an end view of the time-measure ruler embodiment of FIGS. 1-3 showing the friction-wheel locking assembly.

FIG. 5 is a sectional view taken along the lines 5—5 of FIG. 4.

FIG. 6 is a diagrammatic view showing the individual components of the time-measure ruler embodiment of FIGS. 1-3 disassembled.

FIG. 7 is a longitudinal sectional view of the time-measure embodiment of FIGS. 1-3 showing the release button and compression spring employed to actuate the friction-lock wheel.

FIG. 8 is a sectional view taken along the lines 8—8 of FIG. 7.

FIG. 9 is a front-plan view of a second embodiment of the time-measure ruler completely assembled showing the ruler's face with the time scale unextended.

FIG. 10 is a diagrammatic view showing the individual components of the time-measure ruler of FIG. 9 disassembled.

Figure 1:
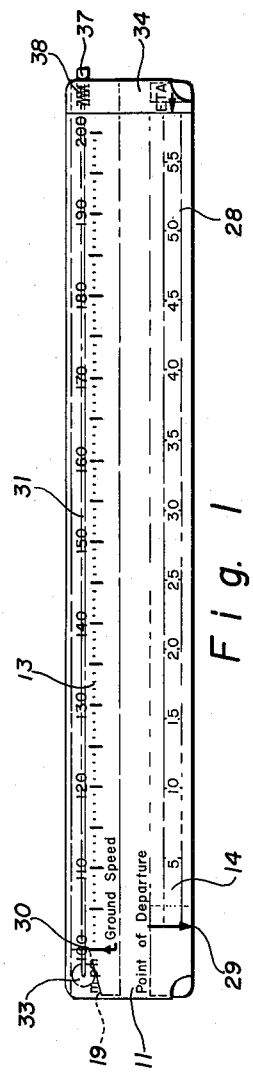
FIG. 1 is a front-plan view of one embodiment of the time-measure ruler completely assembled showing the ruler's face with the time scale unextended.
Figure 2:
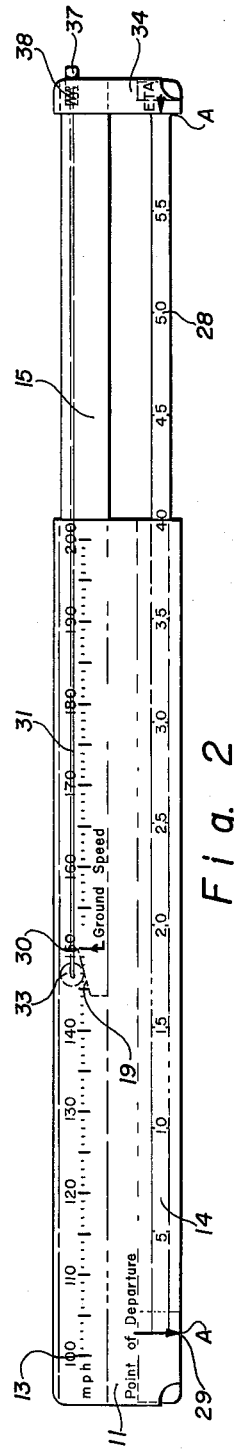
FIG. 2 is a front-plan view of one embodiment of the time-measure ruler showing the ruler's face with the time scale partially extended.
Figure 3:
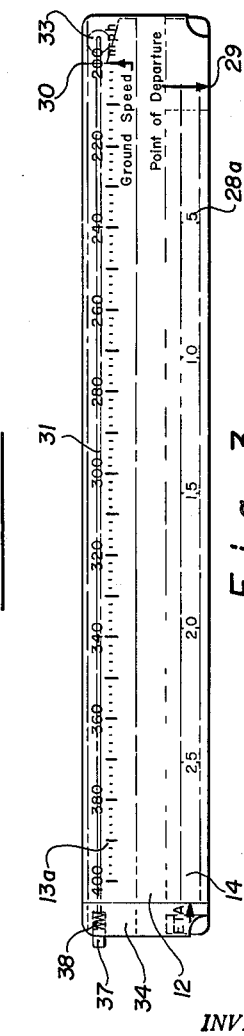
FIG. 3 is a back-plan view of one embodiment of the time-measure ruler showing the ruler's alternate scales with the time scale unextended.

A general description of the invention will first be given with reference to the embodiment shown in FIGS. 1-8, particularly FIGS. 1, 2, 3 and 6. As shown most clearly in the diagrammatic view of FIG. 6, the rigid elongated face member 11 is fixedly secured to the longitudinal ridges of said base member 12. Ruler face 11 is a flat member made preferably of transparent material which is relatively thin and approximately five times as long as it is wide. Face member 11 is provided with a scale 13 marked in units of miles per hour (and/or knots) along its longitudinal axis, the lowest point on said scale being substantially coincident with the anchorage point of elastic member 14. FIGS. 1 and 2 clearly show face member 11 together with the scale. FIG. 3 shows the reverse side of said ruler illustrating the scale 13a printed in like fashion upon the back of base member 12. Substantially rigid slidable member 15 is disposed within the groove 16 of base member 12. Longitudinal groove 16 is formed by longitudinal ridges 17 and 18 of base member 12 and are adapted to provide for the longitudinal movement of member 15 along the length of base member 12 behind rigid elongated face member 11. The terminal portion of slidable member 15 disposed within groove 16 is characterized by slope 19. The opposite terminal portion of slidable member 15 is fixedly secured to anchor member 34. Elastic member 14 is secured at one end by stepped retaining slot 44 in anchor member 34 and at the other end secured by retaining blocks 26 and 27 which are provided on base member 12 and face member 11, respectively. Elastic member 14 is provided with a scale 28 measured in units of time along its longitudinal axis as shown in FIGS. 1 and 2 and an alternate scale 28a shown in FIG. 3. Hence, when slidable member 15 is moved within groove 16 made by ridges 17 and 18 of base member 12 elastic member 14 is stretched causing the time scale to expand in direct proportion to the distance slidable member 15 is pulled.

In operation, the time-measure ruler of the present invention is best described by reference to the embodiment shown in FIGS. 1-8. The point-of-departure arrow 29 of the ruler is placed at the starting point on the map. The longitudinal movable member 15 is moved until the ground-speed pointer 30 is positioned at the speed in miles per hour, as shown in FIG. 2 where the ground speed is designated as 150 miles per hour on scale 13. The effective length of the slidable time-measure ruler is equal in length to the distance traveled in 60 minutes at the rate of 150 miles per hour, the designated speed shown on scale 13. Thus, the estimated travel time in the air or on sea between two fixed points may be ascertained by applying the ruler to the respective points on a map and the time may be read directly from the scale on elastic member 14.

Furthermore, ground speed may quickly be calculated on the ruler. It is merely necessary to note the actual time required to travel between two points on a map. The ruler is then extended so that the point-of-departure arrow 29, which is zero on elastic time scale 28, lies on one point, and the actual elapsed travel time located on scale 28 lies on the second point of the map. Ground speed, independent of wind and currents, is then read directly from scale 13 by means of ground-speed pointer 30. This setting may then be used as a time projection for the next portion of the flight.

Most important, if the distance to be measured on the map is greater than the effective length of the ruler the ruler may be walked across the map and is thus capable of rapid and effective use for distances far in excess of its length. The rule is placed along a line between the two distant points on the map with the point-of-departure arrow 29 at the starting point. The point on the line at the end of the time scale is then noted, and ruler is moved along the line so that the point-of-departure arrow 29 lies at the point on the line which was at the end of the time scale in the preceding position of the ruler. This procedure is repeated until a portion of the time scale rests on the destination point. The number of complete ruler lengths is then mentally added and the total is multiplied by the time on the full length of the scale. This figure is then added to the time on the scale adjacent the destination point. For example, if the full time scale represents one hour and the length of the line between two map points equals two extended ruler lengths plus a reading of 30 minutes on the scale, the travel time is 2 hours and 30 minutes. This unique characteristic of the ruler clearly distinguishes it from navigation rulers of the art, none of which are characterized by a ruler length which varies with the speed of travel and under all circumstances quickly and simply indicates the distance travelled in a designated time period. Because of this feature of the present invention, it may be used efficiently without the extensive arithmetic calculations heretofore considered necessary.

The present ruler may be effectively walked across a map without laborious and time consuming arithmetic calculations because of the novel arrangement and construction of the scales thereon. The full length of scale 28 on elastic member 14 must contain in minutes a number which can readily be mentally added by the user of the rule. For efficient computation the total length of the time scale should be equal to $X(60/Y)$ where X represents an integer of one or more and Y represents an integer of 1, 2, 3, 4, 6 or 12. In other words, Y represents an integer between 1 and 12 which when divided into 60 provides a multiple of 5. Thus, the scale may show from 5 minutes up to any practicable number of hours. In order to make the scale large enough to be read accurately for aerial flight with rulers of a practical length, the scale for best results should not be over 5 hours or 300 minutes long. Thus, in such cases, $X/Y$ preferably is not greater than 5. However, for navigation on sea which is much slower than aerial travel, the scale may cover as much as 30 hours or even more. In practice 60 minutes is preferred on the low speed scale and 30 minutes on the high speed scale. By employing a scale having only the designated number of minutes on the scale, easy calculation is made possible since with such a scale there is no need to add several numbers which are not multiples or divisions of 60 minutes when walking the ruler across a map. On scales of multiples of 60 minutes each 60-minute line is identified with an appropriate hour numeral. Consequently, it is not necessary to subsequently divide a sum not easily divisible by 60 to obtain the number of hours and minutes required to travel between distant map points. Thus, the employment of the present device which always utilizes a time scale 28 which is a multiple or division of 60 makes rapid and accurate mental calculation possible. This unique feature of the present invention has already drawn considerable attention from pilots and navigators who are customarily called upon to make rapid flight time estimates.

The ruler is very convenient to use since the time scale 13 is varied in length by movement of slidable member 15 which is supported by rigid base member 12. The length of the ruler is closable to a convenient pocket length, and yet may be extended for high-speed computations without the necessity of a supporting member.

It should also be noted that for a given map scale, the single ruler may be used for a speed range of from 5 to 45 by utilizing both sides of the ruler. This is illustrated by scales 13 and 28 in FIG. 1 on one side of the ruler, and 13a and 28a on the other side of the ruler shown in FIG. 3. In FIG. 1 the scale 13 covers a ground speed of from 100 to 200 miles per hour, and scale 28 on elastic member 14 covers a time range of up to 60 minutes or one hour. At a setting of 100 miles per hour, the length of the scale 28 in the closed position of the ruler as shown in FIG. 1 is covered in one hour. At a setting of 200 miles per hour ground speed the elastic scale 28 is extended to twice its length in the collapsed state, and thus it reads 60 minutes travel time for 200 miles. On the other side of the ruler shown in FIG. 3, scale 13a covers a ground speed range of from 200 to 400 miles per hour and thus begins at the point where scale 13 ends. The corresponding elastic time scale 28a has a maximum of 30 minutes or one-half hour. In other words, when the ground speed range is doubled, the time for covering the same map distance is cut in half. Thus, the lowest speed on the ruler is 100 miles per hour and the highest is 400 miles per hour. Of course, the speed scales 13 and 13a may be changed to suit the speed range of the plane or boat, and the elastic time scales 28 and 28a may be marked to suit the speed scales as well as the scale of the map which is to be used.

Another important feature of the present invention comprises means by which slidable member 15 is held in a fixed position in the groove 16 of base member 12. One novel securing means of the present invention is best illustrated in FIGS. 4–8. Slidable member 15 is provided with a groove 46 adapted to receive a connecting member which may be a wire or rod 31. Slidable member 15 is also provided at the terminal portion, which is slidably disposed within groove 16 of base member 12, with a sloped portion 19. Disposed within groove 46 of slidable member 15 connecting member 31 is secured to friction-lock wheel 33 which is operatively engaged with said sloped portion 19 of said slidable member 15. As shown best in FIG. 6, friction wheel 33 contains a hole 35 which is larger in diameter than shaft 36 with which it is engaged. This allows play when wheel 33 is moved into and out of contact with ridge 17 of base member 12. In operation, movement of connecting rod 31 causes friction-lock wheel 33 to move up and down slope 19 of slidable member 15. Hence, when connecting member 31 is moved outwardly friction-lock wheel 33 is caused to roll up slope 19 of slidable member 15 and to engage ridge 17 of base member 12.

With reference to FIGS. 1, 2 and 6, the contracting force of elastic member 14 at all times urges leftward movement of slidable member 15, and compression spring 38 normally urges connecting member 31 and friction wheel 33 rightward. Consequently, friction wheel 33 is rolled up slope 19 until the top and bottom of friction wheel 33 are engaged with ridge 17 and slope 19, respectively, and slidable member 15 is engaged with ridge 18. Upon any urging leftward of slidable member 15 by elastic member 14, or any other exterior force, the frictional engagement between the top of friction wheel 33 and its point of contact with ridge 17, and the friction between points of contact of slidable member 15 and ridge 18 are increased because of the attempted expansion of the dimension between ridges 17 and 18 as the result of friction wheel 33 attempting to move farther up slope 19. This results in the effective development of a lock against leftward movement of slidable member 15.

The relative movement leftward within slidable member 15 of connecting member 31 and friction wheel 33 releases the lock when release button 37 is depressed. Locking action is not developed nor necessary against rightward movement of slidable member 15, it being retained in the ruler and held in any position with regard to rightward movement through the contracting force of the elastic member 14.

It is, therefore, possible to set slidable member 15 in groove 16 of base member 12 at any desired position. Thus, the ground-speed pointer 30 may be set at any point on scale 13 by simply causing by movement of connecting member 31 the disengagement of friction-lock wheel 33 with ridge 17, moving slidable member 15 to appropriate position and re-engaging friction-lock wheel 33 with ridge 17 of base member 12.

The opposite end of connecting rod 31 is operatively connected to compression spring 38 disposed within anchor member 34. Anchor member 34 is adapted to receive the terminal portion of slidable member 15. Compression spring 38 which is operatively engaged with connecting member 31 is fixedly secured to release button 37. In order to disengage friction lock 33 release button 37 is simply pushed further compressing compression spring 38 to move connecting member 31 connected to friction-lock wheel 33. By releasing button 37 the lock wheel 33 is pulled up incline 19 by connecting rod 31 through expansion of compression spring 38 into frictional engagement with ridge 17 of base member 12. By pushing button 37 the lock wheel 33 is moved down incline 19 out of frictional engagement with ridge 17 thus affording free movement of slidable member 15 in groove 16 of base member 12. Hence, an infinite number of settings along the entire length of the scale 13 or 13a is made possible. Through the employment of this unique feature of the present invention, prior difficulties encountered in attempting to lock the slidable member at a particular point on the scale are altogether avoided in a simple, efficient and unique fashion.

An alternate means by which the slidable member is held in a fixed position in the groove of the base member is shown in FIGS. 9 and 10. Slidable member 65 is provided with groove 80 adapted to receive a locking pin 81 which must be a spring wire or spring rod. Locking pin 81 is held in groove 80 of slidable member 65 by pins 94, 95 and 97. As shown best in FIG. 9 one terminal portion of locking pin 81 is bent at right angles to the locking pin forming trigger 98 which is held in position by pins 94 and 95. Locking pin 81 passes under pins 95 and 97 and over 96 so that when trigger 98 is depressed, as shown in phantom lines on FIG. 9, the radius of the arc developed in the portion of locking pin 81 adjacent trigger 98 is shortened and the tangent end carrying the bent-up portion 99 is deflected downward and out of one of the perforations 100 in ridge 67. Upon release of trigger 98 the spring tension in locking pin 81 returns bent-up portion 99 to a perforation thus locking slidable member 65. Ridges 67 and 68 of base member 62 form groove 66 in which slidable member 65 is slidably disposed. Trigger 98 of locking pin 81 is disposed within anchor member 84. Anchor member 84 is adapted to receive the terminal portion of slidable member 65 and is also adapted to receive tension anchor member 91 which holds elongated elastic member 64. Elastic member 64 is cast integral with tension anchor members 91 and 92. Tension anchor member 92 is secured by retaining block 76 of base member 62 and retaining block 77 of face member 51 and anchor member 91 is secured by stepped retaining slot 101. Hence, in operation, when slidable member 65 is moved within groove 66 of base member 62 elastic member 64 is either stretched or it contracts. In order to disengage the locking pin 81 in any perforation 100 of ridge 67 it is merely necessary to push downward upon trigger 98 thus causing portion 99 of locking pin 81 to withdraw from a perforation 100 of ridge 67 thus permitting movement of slidable member 65. When it is desired to lock slidable member 65 to prevent movement in groove 66 of base member 62 trigger 98 of locking pin 81 is released. In this way, a simple yet highly efficient method of locking slidable member 65 at a multitude of positions within groove 66 of base member 62 is made possible.

A further unique feature of the present invention is provided by the disposition of tension anchor members 40 and 41. As shown in FIG. 6 these tension anchor members form an integral unit with elastic member 14. One tension anchor member 40 in FIG. 6 is disposed within a stepped retaining slot 44 in anchor member 34, the narrowest portion of the slot having greater dimension than the thickness of elongated elastic member 14. The other tension anchor member 41 is disposed behind retaining block 26 of base member 12 and retaining block 27 of face member 11 which together form a slot of greater dimension than the thickness of elongated elastic member 14. As a result, stretch occurs in that portion of elastic member 14 lying within the slot. Accuracy is obtained by placing the zero time mark and the end of the time scale at the point on elastic member 14 where no stretch occurs, or in other words at the inner faces of tension anchor members 40 and 41. Also, disposition of anchor members 40 and 41 thus permits easy removal and the substitution of other units into the ruler. At the same time the disposition of the anchor member 41 behind the anchor slot formed by retaining blocks 26 and 27 prevents the anchor member from passing through the slot. The ever-present tension in member 14 retains tension anchor members 40 and 41 in proper position. Because maps may vary considerably in distance scales this easy substitution of one elastic member 14 containing time scale 28 for another permits the described ruler to be modified for use on maps of virtually any scale.

Through appropriate and proportional changes of calibrations the present invention may be adapted for use in sea navigation, and by substituting map scales for ground speed and distance for time it may be used to measure linear distances on maps of different and varying scales.

What is claimed is:

1. An extensible time-measure ruler adapted to be used for ascertaining travel time at a designated speed between points on a map comprising an elongated base having a bore extending lengthwise of said base, an elongated slidable member operatively engaged within said bore for movement in a plane substantially parallel to the longitudinal axis of said base to vary the length of said ruler, said slidable member having an outer end and an inner end, a scale on said ruler marked in units of distance per unit of time to indicate varying units of distance per unit of time depending upon the extent to which said slidable member is moved outwardly from said base, an elongated elastic member anchored at one end to the outer end of said slidable member and at its other end to said base whereby movement of said slidable member varies the length of said elastic member in proportion to the variable length of said ruler, a scale on said elastic member marked in units of time, and a locking rod of about the same length as said slidable member, said locking rod having an actuating end secured to the outer end of said slidable member against movement towards the inner end of said slidable member, and said locking rod having a securing end extending within said bore in said base normally resiliently contacting said base to lock said slidable member from movement with respect to said base against the tension of said elastic member.

2. An extensible time-measure ruler adapted to be used for ascertaining travel time at a designated speed between points on a map comprising an elongated base having a bore extending lengthwise of said base beneath a transparent face in said base, a scale marked in units of distance per unit of time along said transparent face of said base, an elongated slidable member operatively engaged within said bore for movement in a plane substantially parallel to the longitudinal axis of said base to vary the length of said ruler, said slidable member having an outer end and an inner end, an elongated elastic member anchored at one end to the outer end of said slidable member and at its other end to said base whereby movement of said slidable member varies the length of said elastic member in proportion to the variable length of said ruler, a scale on said elastic member marked in units of time, and a locking rod of about the same length as said slidable member, said locking rod having an actuating end secured to the outer end of said slidable member against movement towards the inner end of said slidable member, and said locking rod having a securing end extending within said bore in said base normally contacting said base to lock said slidable member from movement with respect to said base against the tension of said elastic member.

3. An extensible time-measure ruler adapted to be used for ascertaining travel time at a designated speed between points on a map comprising an elongated base having a bore extending lengthwise of said base, said base having a plurality of recesses within said bore extending along the longitudinal length of said base, an elongated slidable member operatively engaged within said bore for movement in a plane substantially parallel to the longitudinal axis of said base to vary the length of said ruler, said slidable member having an outer end and an inner end and said slidable member having a longitudinal slot therein, spaced pins in said slot, a scale on said ruler marked in units of distance per unit of time to indicate varying units of distance per unit of time depending upon the extent to which said slidable member is moved outwardly from said base, an elongated elastic member anchored at one end to the outer end of said slidable member and at its other end to said base whereby movement of said slidable member varies the length of said elastic member in proportion to the variable length of said ruler, a scale on said elastic member marked in units of time, and an elongated spring pin locking rod of about the same length as said slidable member lying in the longitudinal slot of said slidable member, said locking rod having an actuating end secured to the outer end of said slidable member against movement towards the inner end of said slidable member, and said locking rod having a bent securing finger at the end of the rod opposite to the actuating end, said spring pin locking rod passing over and under said spaced pins whereby said securing finger is normally resiliently urged into locking engagement with one of said recesses in said base and is movable in a direction away from locking engagement with the recess upon movement of the actuating end of said spring rod in the same direction.

References Cited by the Examiner

UNITED STATES PATENTS

| | | | |
|---|---|---|---|
| 432,278 | 7/1890 | Maschmeyer. | |
| 2,418,985 | 4/1947 | Posey | 33—137 |
| 2,512,184 | 6/1950 | Suydam | 33—137 X |
| 2,916,203 | 12/1959 | Griffiths | 33—107 X |

LOUIS R. PRINCE *Primary Examiner.*

ISAAC LISANN, ROBERT L. EVANS, *Examiners.*

R. P. WILLIAMS, G. M. GRON, *Assistant Examiners.*